United States Patent
Zhou et al.

(10) Patent No.: US 11,670,193 B2
(45) Date of Patent: Jun. 6, 2023

(54) EXTRINSIC PARAMETER OF ON-BOARD SENSOR

(71) Applicant: Huawei Technologies Co., Ltd., Shenzhen (CN)

(72) Inventors: Yueyin Zhou, Shenzhen (CN); Qi Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 435 days.

(21) Appl. No.: 16/734,941

(22) Filed: Jan. 6, 2020

(65) Prior Publication Data

US 2020/0143710 A1    May 7, 2020

Related U.S. Application Data

(63) Continuation of application No. PCT/CN2018/093559, filed on Jun. 29, 2018.

(30) Foreign Application Priority Data

Jul. 6, 2017   (CN) .......................... 201710547094.8

(51) Int. Cl.
  *G09B 29/10*   (2006.01)
  *H04W 4/029*   (2018.01)
  (Continued)

(52) U.S. Cl.
  CPC ......... *G09B 29/102* (2013.01); *G05D 1/0246* (2013.01); *G05D 1/0257* (2013.01);
  (Continued)

(58) Field of Classification Search
  CPC .. G09B 29/102; G05D 1/0246; G05D 1/0257; G06F 16/29; G06T 2207/10028;
  (Continued)

(56) References Cited

U.S. PATENT DOCUMENTS

2009/0210145 A1 *   8/2009   Amano ............ G08G 1/096775
                                                                   701/533
2010/0220173 A1      9/2010   Anguelov et al.
(Continued)

FOREIGN PATENT DOCUMENTS

CN        101641610 A  *  2/2010    ............. G01C 21/28
CN        102944224 A      2/2013
(Continued)

OTHER PUBLICATIONS

Hu, Z., et al., "Solution of Camera Registration Problem Via 3D-2D Parameterized Model Matching for On-Road Navigation," XP002609395, International Journal of Image and Graphics, vol. 04, No. 01, Aug. 7, 2003, 18 pages.

*Primary Examiner* — Mary Cheung
(74) *Attorney, Agent, or Firm* — Conley Rose, P.C.

(57) ABSTRACT

A method for calibrating an extrinsic parameter of an on-board sensor includes obtaining first feature point information collected by a first on-board sensor; determining a geographic location of a vehicle body in which the first on-board sensor is located in a world coordinate system; determining second feature point information within a collection range of the first sensor in a map database based on the geographic location of the vehicle body in the world coordinate system; determining a plurality of first feature points and a plurality of second feature points based on the first feature point information and the second feature point information.

20 Claims, 7 Drawing Sheets

(51) Int. Cl.
 *G06F 16/29* (2019.01)
 *G05D 1/02* (2020.01)
 *H04W 4/021* (2018.01)
(52) U.S. Cl.
 CPC ............ *G06F 16/29* (2019.01); *H04W 4/021* (2013.01); *H04W 4/029* (2018.02)
(58) Field of Classification Search
 CPC . G06T 2207/30244; G06T 2207/30252; G06T 7/13; G06T 7/73; G06T 7/80; G06T 2207/10044; G01D 18/00; H04W 4/021; H04W 4/029
 See application file for complete search history.

(56) References Cited

U.S. PATENT DOCUMENTS

| | | | |
|---|---|---|---|
| 2013/0325252 | A1 | 12/2013 | Schommer et al. |
| 2015/0222813 | A1 | 8/2015 | Okude et al. |
| 2019/0025057 | A1* | 1/2019 | Sakai ................... G08G 1/13 |
| 2019/0147622 | A1 | 5/2019 | Li et al. |

FOREIGN PATENT DOCUMENTS

| | | | | | |
|---|---|---|---|---|---|
| CN | 102968548 | A | | 3/2013 | |
| CN | 103250069 | A | | 8/2013 | |
| CN | 103487034 | A | | 1/2014 | |
| CN | 103954275 | A | | 7/2014 | |
| CN | 103985118 | A | | 8/2014 | |
| CN | 104142157 | A | | 11/2014 | |
| CN | 104276102 | A | | 1/2015 | |
| CN | 104809718 | A | | 7/2015 | |
| CN | 105164497 | A | * | 12/2015 | ............ G01C 21/36 |
| CN | 105588563 | A | | 5/2016 | |
| CN | 105741275 | A | | 7/2016 | |
| CN | 105931261 | A | | 9/2016 | |
| CN | 106379322 | A | | 2/2017 | |
| CN | 106485753 | A | | 3/2017 | |
| CN | 106651961 | A | | 5/2017 | |
| CN | 106651963 | A | | 5/2017 | |
| CN | 106671902 | A | | 5/2017 | |
| CN | 106740872 | A | | 5/2017 | |
| CN | 107103627 | A | | 8/2017 | |
| DE | 102010062696 | A1 | | 6/2012 | |
| DE | 102015206605 | A1 | | 10/2016 | |
| EP | 2530647 | A1 | | 12/2012 | |
| EP | 3001137 | A1 | | 3/2016 | |
| JP | 2000268295 | A | * | 9/2000 | |
| JP | 2004527852 | A | | 9/2004 | |
| JP | 2013024712 | A | | 2/2013 | |
| JP | 2014032118 | A | | 2/2014 | |
| JP | 2017038777 | A | | 2/2017 | |
| JP | 2017181195 | A | * | 10/2017 | |
| WO | WO-2017016799 | A1 | * | 2/2017 | ............ B60W 30/12 |

* cited by examiner

EXTRINSIC PARAMETER OF ON-BOARD SENSOR

CROSS-REFERENCE TO RELATED APPLICATIONS

This is a continuation of Int'l Patent App. No. PCT/CN2018/093559 filed on Jun. 29, 2018, which claims priority to Chinese Patent App. No. 201710547094.8 filed on Jul. 6, 2017, which are incorporated by reference.

TECHNICAL FIELD

Embodiments of this application relate to the automobile field, and more specifically, to a method and a device for calibrating an extrinsic parameter of an on-board sensor.

BACKGROUND

Reliability of automatic driving is based on converged sensing of a plurality of on-board sensors, and the converged sensing of the plurality of sensors is based on spatial consistency. An extrinsic sensor parameter reflects a spatial relative location and a posture relationship between sensors. Currently, an extrinsic parameter of a sensor on an autonomous vehicle is calibrated by observing some manually preset markers in a check field or an indoor laboratory in a fixed area. When an autonomous vehicle is used for a period of time after delivery, a relative relationship between spatial locations of sensors is offset because of external factors such as long-time high-frequency vibration and collision and rubbing. In this case, depot recalibration is required. With gradual promotion of an autonomous vehicle market, an increasing quantity of users inevitably poses increasing demand for depot recalibration. Extensive depot recalibration causes high transportation and time costs, and also makes severe negative impact on user experience.

Therefore, it is desirable to automatically calibrate, in a process of using an autonomous vehicle, a sensor based on sensing data of the sensor.

SUMMARY

Embodiments of this application provide a method and a device for calibrating an extrinsic parameter of an on-board sensor, so that an on-board sensor of an autonomous vehicle can be automatically calibrated without relying on a fixed check place or laboratory. This can improve user experience.

According to a first aspect, a method for calibrating an extrinsic parameter of an on-board sensor is provided, including: obtaining first feature point information collected by a first on-board sensor; determining a geographic location of a vehicle body in a world coordinate system based on location information collected by a position and orientation system POS sensor; determining second feature point information within a collection range of the first sensor in a map database based on the geographic location of the vehicle body in the world coordinate system, where the map database is established based on the world coordinate system; determining a plurality of first feature points and a plurality of second feature points based on the first feature point information and the second feature point information; determining coordinates of the plurality of second feature points in the vehicle body coordinate system based on the geographic location of the vehicle body in the world coordinate system and geographic locations of the plurality of second feature points in the world coordinate system; and determining a parameter of mapping from the first on-board sensor to the vehicle body based on the plurality of first feature points and the coordinates of the plurality of second feature points in the vehicle body coordinate system.

A device obtains the first feature point information collected by the first on-board sensor, and determines the geographic location of the vehicle body in which the first on-board sensor is located in the world coordinate system based on the location information collected by the position and orientation system POS sensor. The device determines the second feature point information within the collection range of the first sensor in the map database based on the geographic location of the vehicle body in the world coordinate system, and the map database is established based on the world coordinate system. The device determines the plurality of first feature points and the plurality of second feature points based on the first feature point information and the second feature point information, determines the coordinates of the plurality of second feature points in the vehicle body coordinate system based on the geographic location of the vehicle body in the world coordinate system and the geographic locations of the plurality of second feature points in the world coordinate system, and determines the parameter of mapping from the first on-board sensor to the vehicle body based on the plurality of first feature points and the coordinates of the plurality of second feature points in the vehicle body coordinate system.

Therefore, the device determines the second feature point information within the collection range of the first sensor in the map database, and the plurality of first feature points and the plurality of second feature points based on the first feature point information collected by the first on-board sensor and the geographic location of the vehicle body in the world coordinate system, and determines the parameter of mapping from the first on-board sensor to the vehicle body based on the plurality of first feature points and the coordinates of the plurality of second feature points in the vehicle body coordinate system, so as to calibrate an extrinsic parameter of the first on-board sensor. In this way, an on-board sensor of an autonomous vehicle can be automatically calibrated without relying on a fixed check place or laboratory, so as to improve user experience.

Optionally, in an implementation of the first aspect, the method further includes: determining a parameter of mapping from the vehicle body to the first on-board sensor based on the determined parameter of mapping from the first on-board sensor to the vehicle body; and determining a parameter of mapping from a second on-board sensor to the first on-board sensor based on a parameter of mapping from the second on-board sensor to the vehicle body and the parameter of mapping from the vehicle body to the first on-board sensor.

Optionally, in an implementation of the first aspect, the determining a parameter of mapping from the vehicle body to the first on-board sensor based on the determined parameter of mapping from the first on-board sensor to the vehicle body includes: performing inversion on the parameter of mapping from the first on-board sensor to the vehicle body, to obtain the parameter of mapping from the vehicle body to the first on-board sensor; and the determining a parameter of mapping from a second on-board sensor to the first on-board sensor based on a parameter of mapping from the second on-board sensor to the vehicle body and the parameter of mapping from the vehicle body to the first on-board sensor includes: multiplying the parameter of mapping from the second on-board sensor to the vehicle body by the parameter of mapping from the vehicle body to the first on-board sensor, to obtain the parameter of mapping from the second on-board sensor to the first on-board sensor.

In this case, the parameter of mapping from the first on-board sensor to the vehicle body and the parameter of mapping from the second on-board sensor to the vehicle body are obtained, so that a mapping relationship between coordinates of any on-board sensor and any other on-board sensor can be implemented. This implements mutual calibration between on-board sensors.

Optionally, in an implementation of the first aspect, the determining a parameter of mapping from the first on-board sensor to the vehicle body based on the plurality of first feature points and the coordinates of the plurality of second feature points in the vehicle body coordinate system includes: determining that a precision check on the plurality of first feature points succeeds; and determining the parameter of mapping from the first on-board sensor to the vehicle body based on the plurality of first feature points that succeed in the precision check and the coordinates of the plurality of second feature points in the vehicle body coordinate system.

In this case, the precision check is performed on the first feature points, so that an error that may occur in a process of obtaining or matching the first feature points is avoided, an observed value with a gross error is automatically removed, and a parameter of mapping from the on-board sensor to the world coordinate system is calibrated based on the first feature points that succeed in the precision check. This improves reliability and accuracy of the parameter of mapping from the on-board sensor to the world coordinate system.

Optionally, in an implementation of the first aspect, the first on-board sensor includes any one of the following on-board sensors: a laser radar on-board sensor, a camera on-board sensor, and a millimeter-wave radar on-board sensor.

Optionally, in an implementation of the first aspect, when the first on-board sensor is the laser radar on-board sensor or the millimeter-wave radar on-board sensor, the determining that a precision check on the plurality of first feature points succeeds includes: determining an initial parameter of mapping from the first on-board sensor to the vehicle body based on the plurality of first feature points and the coordinates of the plurality of second feature points in the vehicle body coordinate system; determining coordinates of the first feature points in the vehicle body coordinate system based on coordinates of the first feature points and the initial mapping parameter; determining coordinates of the first feature points in the map database based on the coordinates of the first feature points in the vehicle body coordinate system and the POS sensor; and when a difference between the determined coordinates of each of the first feature points in the map database and coordinates of a second feature point that matches the first feature point in the map database is less than a first threshold, determining that the precision check on the first feature points succeeds.

Optionally, in an implementation of the first aspect, when the first on-board sensor is the camera on-board sensor, the determining that a precision check on the plurality of first feature points succeeds includes: determining an initial parameter of mapping from the first on-board sensor to the vehicle body based on the plurality of first feature points and the coordinates of the plurality of second feature points in the vehicle body coordinate system; determining pixel coordinates of the plurality of first feature points corresponding to the plurality of second feature points based on the coordinates of the plurality of matched second feature points in the vehicle body coordinate system and the initial mapping parameter; and when a difference between the determined pixel coordinates of each of the plurality of first feature points and obtained pixel coordinates of the first feature point is less than a second threshold, determining that the precision check on the first feature points succeeds.

Optionally, in an implementation of the first aspect, when the first on-board sensor is the laser radar on-board sensor, the obtaining first feature point information collected by a first on-board sensor includes: obtaining the plurality of first feature points and a contour size of a first marker corresponding to the plurality of first feature points, where the plurality of first feature points are a plurality of corner coordinates of the first marker; and the determining a plurality of first feature points and a plurality of second feature points based on the first feature point information and the second feature point information includes: when a difference between the contour size of the first marker corresponding to any one of the plurality of feature points in the first feature point information and a contour size of the first marker corresponding to any one of the plurality of feature points in the second feature point information is less than a third threshold, determining that the any one of the plurality of feature points in the first feature point information is the first feature point, and the any one of the plurality of feature points in the second feature point information is the second feature point.

Optionally, in an implementation of the first aspect, the first on-board sensor is the millimeter-wave radar on-board sensor, and the obtaining first feature point information collected by a first on-board sensor includes: obtaining the plurality of first feature points included in the first feature point information and a fixed interval d1 between neighboring first feature points in the plurality of first feature points; and the determining a plurality of first feature points and a plurality of second feature points based on the first feature point information and the second feature point information includes: when a difference between the fixed interval d1 between the neighboring feature points in the plurality of feature points in the first feature point information and a fixed interval d between the neighboring feature points in the plurality of feature points in the map database is less than a fourth threshold, determining that the fixed interval d1 between the neighboring feature points in the plurality of feature points in the first feature point information is the first feature points, and the fixed interval d between the neighboring feature points in the plurality of feature points in the map database is the second feature points.

Optionally, in an implementation of the first aspect, the first on-board sensor is the camera on-board sensor, and the obtaining first feature point information collected by a first on-board sensor includes: obtaining pixel coordinates of a plurality of first feature points of a third marker and an image size of the third marker, where the plurality of first feature points constitute a geometric center of an image of the third marker; and the determining a plurality of first feature points and a plurality of second feature points based on the first feature point information and the second feature point information includes: determining a distance between the first on-board sensor and the third marker based on a geographic location of the first on-board sensor and coordinates of the third marker in the map database; determining, based on the distance between the first on-board sensor and the third marker, a theoretical size of the third marker in an image obtained by the camera sensor; and when a difference between the theoretical size of the third marker in the image and an actual size of the third marker in the image is less than a fifth threshold, determining that the pixel coordinates of the plurality of first feature points of the third marker are the plurality of first feature points, and coordinates corresponding to the third marker in the map database are the plurality of second feature points.

According to a second aspect, a method for collecting data by a laser radar sensor is provided, including: obtaining a contour of a first marker; determining first feature point information of the first marker based on the contour, where the first feature point information includes a plurality of feature points and a contour size of the first marker corresponding to the plurality of feature points, and the plurality of feature points are a plurality of corner points of the first marker.

Optionally, in an implementation of the second aspect, the obtaining a contour of a first marker includes: extracting the contour of the first marker by using a point cloud filtering de-noising and region proximal point algorithm and a vector solving algorithm.

According to a third aspect, a method for collecting data by a millimeter-wave radar sensor is provided, including: obtaining coordinates of a plurality of first markers, where an interval between the plurality of first markers is fixed in a linear direction; and determining a fixed interval d1 between neighboring first feature points in the plurality of first markers.

According to a fourth aspect, a method for collecting data by a camera sensor is provided, including: obtaining an image of a first marker; and determining, based on the image of the first marker, first feature point information collected by the camera sensor, where the first feature point information includes pixel coordinates of the plurality of first feature points and an image size of the third marker, where the plurality of feature points constitute a geometric center of an image of the third marker.

Optionally, in an implementation of the fourth aspect, when the first marker is a traffic signal light, the determining, based on the image of the first marker, first feature point information collected by the camera sensor includes: respectively extracting all red, yellow, and green feature areas from the image through red, green, and blue channels; and extracting an edge point of the red-green-blue channel image; and determining a geometric center of the red-green-blue channel image based on the edge point of the red-green-blue channel image; and obtaining pixel coordinates of the geometric center of the red-green-blue channel image.

According to a fifth aspect, a control device is provided, including an obtaining module and a determining module. The control device may perform the method in the first aspect or any optional implementation of the first aspect.

According to a sixth aspect, a laser radar sensor is provided, including an obtaining module and a determining module. The laser radar sensor may perform the method in the second aspect or any optional implementation of the second aspect.

According to a seventh aspect, a millimeter-wave radar sensor is provided, including an obtaining module and a determining module. The millimeter-wave radar sensor may perform the method in the third aspect or any optional implementation of the third aspect.

According to an eighth aspect, a camera radar sensor is provided, including an obtaining module and a determining module. The camera radar sensor may perform the method in the fourth aspect or any optional implementation of the fourth aspect.

According to a ninth aspect, a vehicle is provided, including a control device, a laser radar sensor, a millimeter-wave radar sensor, and a camera sensor.

According to a tenth aspect, an electronic device is provided, including a memory and a processor. The memory stores program code that may be used to instruct to perform any optional implementation described above; and when the code is executed, the processor may implement each operation performed by a terminal device in the method.

According to an eleventh aspect, a computer storage medium is provided. The computer storage medium stores program code, and the program code may be used to instruct to perform the method in any optional implementation described above.

DESCRIPTION OF EMBODIMENTS

The following describes technical solutions in the embodiments of this application with reference to accompanying drawings.

Figure 1:
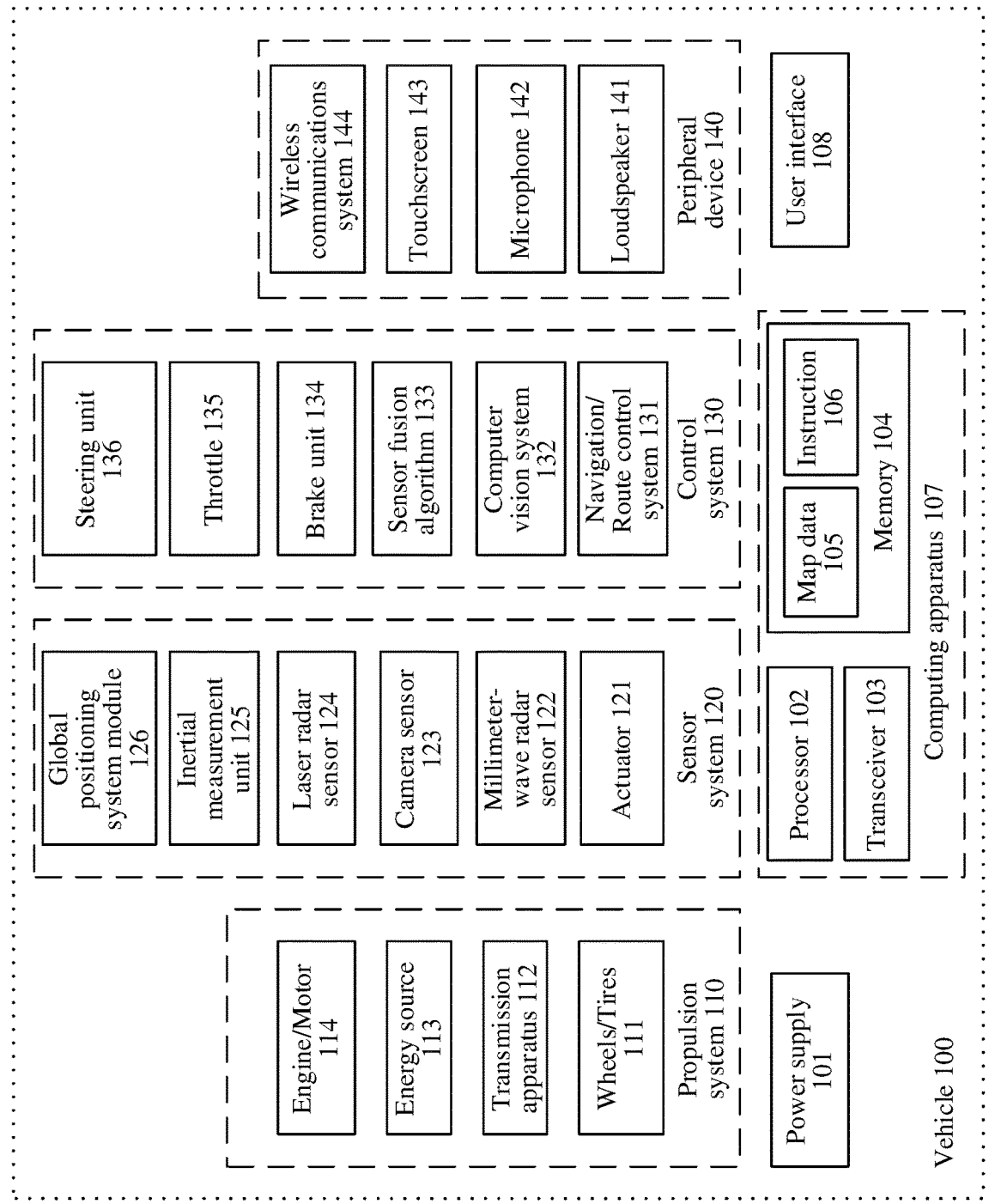
FIG. 1 is a functional block diagram of an example vehicle 100 according to an embodiment of this application.

FIG. 1 is a functional block diagram of an example vehicle 100 according to an embodiment of this application. Components coupled to the vehicle 100 or included in the vehicle 100 may include a propulsion system 110, a sensor system 120, a control system 130, a peripheral device 140, a power supply 101, a computing apparatus 107, and a user interface 108. The computing apparatus 107 may include a processor 102, a transceiver 103, and a memory 104. The computing apparatus 107 may be a controller of the vehicle 100 or a part of the controller. The memory 104 may include an instruction 106 that can be executed by the processor 102, and may further store map data 105. The components of the vehicle 100 may be configured to work by interconnecting to each other and/or by interconnecting to other components coupled to respective systems. For example, the power supply 101 may supply power to all the components of the vehicle 100. The computing apparatus 107 may be configured to: receive data from the propulsion system 110, the sensor system 120, the control system 130, and the peripheral device 140, and control the data. The computing apparatus 107 may be configured to: display an image on the user interface 108, and receive an input from the user interface 108.

In another example, the vehicle 100 may include more, fewer, or different systems, and each system may include more, fewer, or different components. In addition, the shown systems and components may be combined or classified in any manner.

The propulsion system 110 may be configured to provide power for the vehicle 100 for motion. As shown in the figure, the propulsion system 110 includes an engine/a motor 114, an energy source 113, a transmission apparatus 112, and wheels/tires 111.

The propulsion system 110 may additionally or alternatively include a component other than those shown components.

The sensor system 104 may include several sensors configured to sense information about an environment in which the vehicle 100 is located. As shown in the figure, the sensor of the sensor system 104 includes a global positioning system GPS 126, an inertial measurement unit (IMU) 125, a laser radar sensor 124, a camera sensor 123, a millimeter-wave radar sensor 122, and an actuator 121 configured to modify a location and/or an orientation of the sensor. The sensor system 120 may also include an additional sensor such as a sensor (for example, an O2 monitor, a fuel meter, or an oil temperature) for monitoring an internal system of the vehicle 100. The sensor system 120 may also include another sensor.

The GPS module 126 may be any sensor configured to estimate a geographic location of the vehicle 100. Therefore, the GPS module 126 may include a transceiver configured to estimate a location of the vehicle 100 relative to the earth based on satellite positioning data. In an example, the computing apparatus 107 may be configured to estimate, with reference to the map data 105 by using the GPS module 126, a location of a lane boundary on a road on which the vehicle 100 may travel. The GPS module 126 may also be in another form.

The IMU 125 may be configured to sense a location and orientation change of the vehicle 100 based on inertia, acceleration, and any combination thereof. In some examples, a combination of sensors may, for example, include an accelerometer and a gyroscope. There is also another possible combination of sensors.

The laser radar (LiDAR) sensor 124 may be considered as an object detection system. The sensor senses or detects, through light, an object in the environment in which the vehicle 100 is located. Generally, LiDAR is an optical remote sensing technology in which a distance to a target or another attribute of the target can be measured by illuminating the target with the light. In an example, the LiDAR sensor 124 may include a laser source and/or a laser scanner configured to transmit a laser pulse, and a detector configured to receive reflection of the laser pulse. For example, the LiDAR sensor 124 may include a laser rangefinder reflected by a rotating mirror, and scan a laser around a digitized scenario in one dimension or two dimensions, to collect a distance measurement value at a specified angle interval. In an example, the LiDAR sensor 124 may include components such as a light (such as laser) source, a scanner, an optical system, an optical detector, an electronic device such as a receiver, and a location and navigation system. The LiDAR sensor 124 determines a distance to an object by scanning a laser that is reflected back by the object, so that a 3D environment diagram with precision of up to a centimeter level can be obtained.

The camera sensor 123 may be any camera (such as a still camera or a video camera) configured to obtain an image of the environment in which the vehicle 100 is located. Therefore, the camera may be configured to detect visible light, or may be configured to detect light from another part of a spectrum (for example, infrared light or ultraviolet light). There is another possible type of camera. The camera 123 may be a two-dimensional detector, or may have a three-dimensional spatial range. In some examples, the camera 123 may be, for example, a distance detector, and the distance detector is configured to generate a two-dimensional image for indicating distances from the camera 123 to several points in the environment. Therefore, the camera 123 may use one or more distance detection technologies. For example, the camera 123 may be configured to use a structured light technology. The vehicle 100 uses a preset light pattern such as a grid or checkerboard pattern to illuminate the object in the environment, and uses the camera 134 to detect reflection of the preset light pattern of the object. Based on distortion in the reflected light pattern, the vehicle 100 may be configured to detect a distance to a point on the object. The preset light pattern may include infrared light, or light of another wavelength.

The millimeter-wave radar sensor 122 is usually an object detection sensor with a wavelength of 1 to 10 mm, and a frequency range is approximately 10 gigahertz (GHz) to 200 GHz. A millimeter-wave radar measurement value has depth information, and can provide a distance to a target. In addition, because millimeter-wave radar has a significant Doppler effect and is very sensitive to a speed, the millimeter-wave radar may directly obtain a speed of the target, and may extract the speed of the target by detecting a Doppler shift of the target. Currently, frequency bands of two types of mainstream on-board millimeter-wave radar are respectively 24 GHz and 77 GHz. The former on-board millimeter-wave radar has an approximate 1.25 centimeters (cm) wavelength, and is mainly used for short-distance sensing, for example, vehicle surroundings, a blind spot, parking assistance, and lane assistance. The latter on-board millimeter-wave radar has an approximate 4 mm wavelength, and is used for medium-and-long distance measurement, for example, automatous vehicle following, adaptive cruise control (ACC), and autonomous emergency braking (AEB).

The control system 130 may be configured to control operations of the vehicle 100 and the components of the vehicle 100. Therefore, the control system 130 may include a steering unit 136, a throttle 135, a brake unit 134, a sensor fusion algorithm 133, a computer vision system 132, and a navigation or route control (pathing) system 131.

The control system 130 may additionally or alternatively include a component other than those shown components.

The peripheral device 140 may be configured to allow the vehicle 100 to interact with an external sensor, another vehicle, and/or a user. Therefore, the peripheral device 140 may, for example, include a wireless communications system 144, a touchscreen 143, a microphone 142, and/or a loudspeaker 141.

The peripheral device 140 may additionally or alternatively include a component other than those shown components.

The power supply 101 may be configured to supply power to some or all of the components of the vehicle 100. Therefore, the power supply 110 may, for example, include a rechargeable lithium-ion or lead-acid battery. In some examples, one or more battery groups may be configured to supply power. Another power supply material and configuration are also possible. In some examples, the power supply 110 and the energy source 113 may be implemented together like in some full-electric vehicles.

The processor 102 included in the computing apparatus 107 may include one or more general-purpose processors and/or one or more dedicated processors (such as an image processor and a digital signal processor). When the processor 102 includes more than one processor, the processors may work separately or work together. The computing apparatus 107 may implement a function of controlling the vehicle 100 based on the input received from the user interface 108.

The transceiver 103 is configured to implement communication between the computing apparatus 107 and each system.

The memory 104 may further include one or more volatile storage components and/or one or more non-volatile storage components, for example, an optical storage apparatus, a magnetic storage apparatus, and/or an organic storage apparatus, and the memory 104 may be completely or partially integrated with the processor 102. The memory 104 may include the instruction 106 (such as program logic) that can be executed by the processor 102, to execute various vehicle functions, including any one of functions or methods described in this specification.

The components of the vehicle 100 may be configured to work by interconnecting to other components inside and/or outside respective systems. Therefore, the components and systems of the vehicle 100 may be communicatively connected by using a system bus, a network, and/or another connection mechanism.

To better understand the embodiments of this application, the following describes the embodiments of this application with reference to FIG. 2 to FIG. 12 by using a system that is the same as or similar to the system shown in FIG. 1 as an example.

Figure 2:
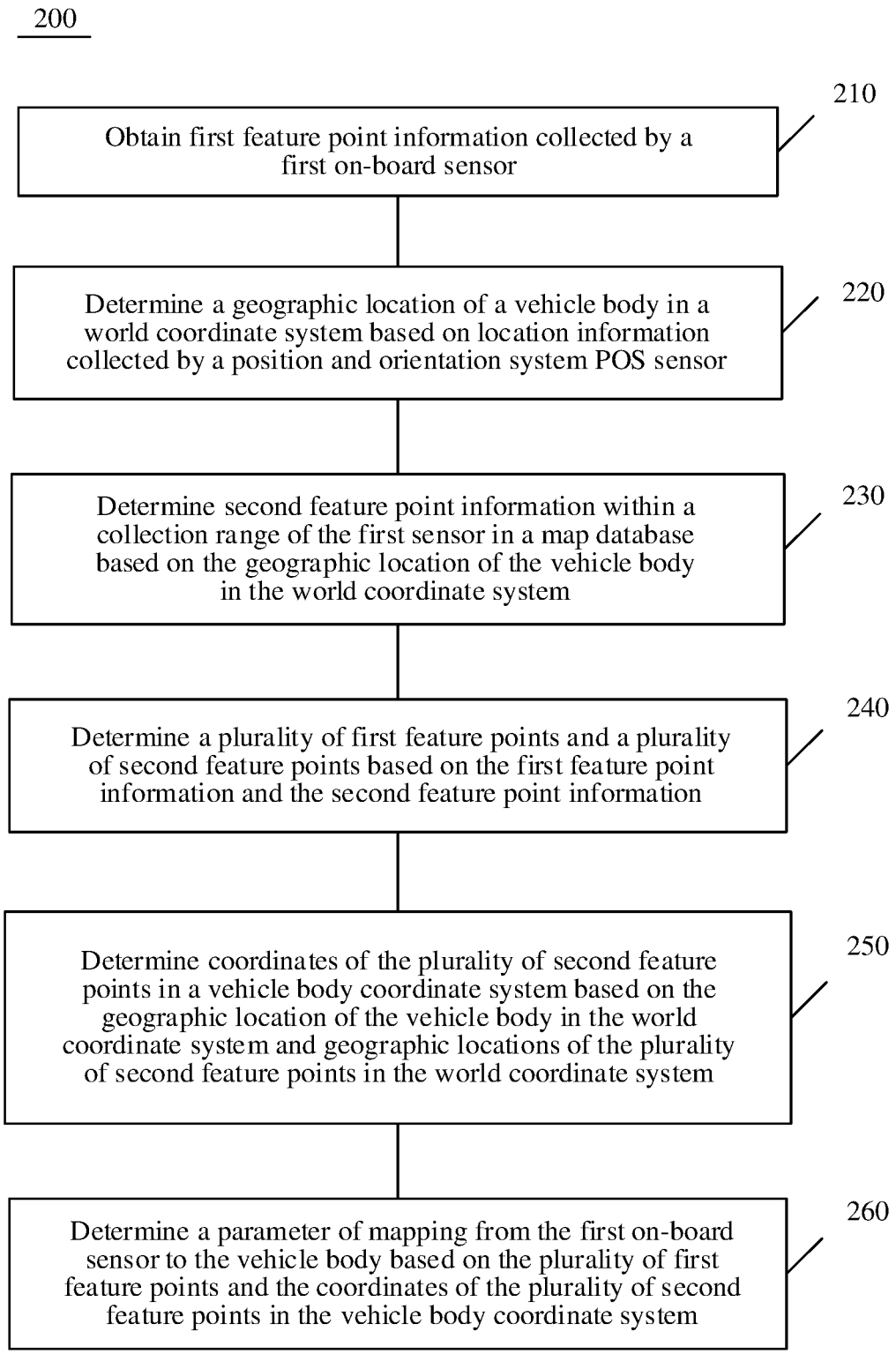
FIG. 2 is a schematic flowchart of a method 200 for calibrating an extrinsic parameter of an on-board sensor according to an embodiment of this application.

FIG. 2 is a schematic flowchart of a method 200 for calibrating an extrinsic parameter of an on-board sensor according to an embodiment of this application. As shown in FIG. 2, the method 200 includes the following content.

210. A device obtains first feature point information collected by a first on-board sensor.

Optionally, the first on-board sensor includes any one of the following on-board sensors: a laser radar on-board sensor, a camera on-board sensor, and a millimeter-wave radar on-board sensor.

Optionally, when the first on-board sensor is the laser radar on-board sensor, the obtaining first feature point information collected by a first on-board sensor includes: obtaining a plurality of first feature points and a contour size of a first marker corresponding to the plurality of first feature points, where the plurality of first feature points are a plurality of corner coordinates of the first marker.

Optionally, the first on-board sensor is the millimeter-wave radar on-board sensor, and the obtaining first feature point information collected by a first on-board sensor includes: obtaining the plurality of first feature points included in the first feature point information and a fixed interval d1 between neighboring first feature points in the plurality of first feature points.

Optionally, the first on-board sensor is the camera on-board sensor, and the obtaining first feature point information collected by a first on-board sensor includes: obtaining pixel coordinates of a plurality of first feature points of a third marker and an image size of the third marker, where the plurality of first feature points constitute a geometric center of an image of the third marker.

Optionally, the first marker, the second marker, and the third marker are common city construction ground features on city roads, for example, an existing landmark building, a traffic signal light, a long-term fixed billboard in city construction.

In this case, the first feature point of the existing city construction ground feature that is collected by the sensor is obtained without requiring additional manual production costs. Therefore, costs of calibrating an extrinsic parameter of the sensor are reduced.

220. Determine a geographic location of the vehicle body in a world coordinate system based on a POS sensor.

Optionally, the geographic location of the vehicle body in the world coordinate system is determined based on the POS sensor (namely, an inertial group including a GPS and an inertial navigation device).

It should be understood that the first on-board sensor is located in the vehicle body.

230. Determine second feature point information within a collection range of the first sensor in a map database based on a geographic location of the first on-board sensor in the world coordinate system, where the map (geographical information system (GIS) database is established based on the world coordinate system.

Specifically, the map GIS database is searched for an available feature point list of the first sensor within a location collection range of the current map database based on the geographic location of the first on-board sensor in the world coordinate system.

240. Determine a plurality of first feature points and a plurality of second feature points based on the first feature point information and the second feature point information.

Optionally, when the first on-board sensor is the laser radar on-board sensor, the determining a plurality of first feature points and a plurality of second feature points based on the first feature point information and the second feature point information includes: when a difference between the contour size of the first marker corresponding to any one of the plurality of feature points in the first feature point information and a contour size of the first marker corresponding to any one of the plurality of feature points in the second feature point information is less than a third threshold, determining that the any one of the plurality of feature points in the first feature point information is the first feature point, and the any one of the plurality of feature points in the second feature point information is the second feature point.

Specifically, the first feature point information obtained by the device, for example, a length, a width, or a height of the first marker, is matched against a length, a width, or a height of the first marker corresponding to the second feature point information obtained from the map database through screening. For example, Table 1 is a list of information that is about a series of buildings and that is output by the device in the map database based on the geographic location of the current laser radar on-board sensor in the world coordinate system.

TABLE 1

Building information database

| Column name | Data type | Description |
|---|---|---|
| Architecture ID | Int | Building identifier |
| L | Double | Length of a building along a road direction |
| W | Double | Width of the building |
| H | Double | Height of the building |
| A1 | Double | Included angle between two sides at a feature point 1 |
| A2 | Double | Included angle between two sides at a feature point 2 |
| FeaturePoint1 | Struct {ID, X, Y, Z} | Coordinates of a feature point 1 |
| FeaturePoint2 | Struct {ID, X, Y, Z} | Coordinates of a feature point 2 |

The obtained first feature point information collected by the laser radar sensor is matched against the feature points in Table 1. When the difference between the contour size of the first marker corresponding to the any one of the plurality of feature points in the first feature point information and the contour size of the first marker corresponding to the any one of the plurality of feature points in the second feature point information is less than the third threshold, it is determined that the any one of the plurality of feature points in the first feature point information is the first feature point, and the any one of the plurality of feature points in the second feature point information is the second feature point.

Optionally, when the first on-board sensor is the millimeter-wave radar on-board sensor, the determining a plurality of first feature points and a plurality of second feature points based on the first feature point information and the second feature point information includes: when a difference between the fixed interval d1 between the neighboring feature points in the plurality of feature points in the first feature point information and a fixed interval d between the neighboring feature points in the plurality of feature points in the map database is less than a fourth threshold, determining that the fixed interval d1 between the neighboring feature points in the plurality of feature points in the first feature point information is the first feature points, and the fixed interval d between the neighboring feature points in the plurality of feature points in the map database is the second feature points.

Optionally, when the first on-board sensor is the camera sensor, the determining a plurality of first feature points and a plurality of second feature points based on the first feature point information and the second feature point information includes: determining a distance between the first on-board sensor and the third marker based on a geographic location of the first on-board sensor and coordinates of the third marker in the map database; determining, based on the distance between the first on-board sensor and the third marker, a theoretical size of the third marker in an image obtained by the camera sensor; and when a difference between the theoretical size of the third marker in the image and an actual size of the third marker in the image is less than a fifth threshold, determining that the pixel coordinates of the plurality of first feature points of the third marker are the plurality of first feature points, and coordinates corresponding to the third marker in the map database are the plurality of second feature points.

Optionally, when the third marker is a traffic signal light, the determining a plurality of first feature points and a plurality of second feature points based on the first feature point information and the second feature point information includes: respectively extracting red, yellow, and green feature areas from an original image through red, green, and blue channels; respectively extracting circular enclosed areas through the three channels; performing screening on the extracted circular areas based on a length-width ratio of the traffic signal light and a maximum-minimum condition; and determining that pixel coordinates corresponding to a channel with a unique circle in the three channels are the first feature points and coordinates, in the map database, of the third marker corresponding to the channel with the unique circle are the second feature points.

In this case, the plurality of obtained first feature points are intelligently matched with the plurality of second feature points in the map database, so as to avoid a case in which whether to match feature points in a process of using an autonomous vehicle is selected manually, and reduce an error caused by manual intervention.

250. Determine coordinates of the plurality of second feature points in the vehicle body coordinate system based on the geographic location of the vehicle body in the world coordinate system and geographic locations of the plurality of second feature points in the world coordinate system.

260. Determine a parameter of mapping from the first on-board sensor to the vehicle body based on the plurality of first feature points and the coordinates of the plurality of second feature points in the vehicle body coordinate system.

An extrinsic parameter of a sensor is a relative location relationship between the sensor and the vehicle body. $P_w$ is defined as a vehicle body coordinate system, and $P_c$ is a sensor coordinate system. A relationship between the world coordinate system $P_w$ and the sensor coordinate system $P_c$ is shown in the following formula:

$$P_c = RP_w + T \quad (1)$$

In the formula, R is a rotation matrix, T is a translation vector, and R and T are extrinsic parameters of the sensor. The translation vector T is a deviation along three coordinate axes, and may be considered as a rigid translation vector between two coordinate systems. The rotation matrix R is an orthogonal matrix of 3×3. If rotation angle parameters are respectively $\hat{\alpha}$, $\hat{\beta}$, and $\hat{\gamma}$, three rotation matrices are continuedly multiplied around the coordinate axes to obtain the following formula:

$$R = R_X(\hat{\alpha}) \cdot R_Y(\hat{\beta}) \cdot R_Z(\hat{\gamma}), \quad (2)$$

where $$R_X(\hat{\alpha}) = \begin{bmatrix} 1 & 0 & 0 \\ 0 & \cos(\hat{\alpha}) & -\sin(\hat{\alpha}) \\ 0 & \sin(\hat{\alpha}) & \cos(\hat{\alpha}) \end{bmatrix} \quad (3)$$

$$R_Y(\hat{\beta}) = \begin{bmatrix} \cos(\hat{\beta}) & 0 & \sin(\hat{\beta}) \\ 0 & 1 & 0 \\ -\sin(\hat{\beta}) & 0 & \cos(\hat{\beta}) \end{bmatrix}$$

$$R_Z(\hat{\gamma}) = \begin{bmatrix} \cos(\hat{\gamma}) & -\sin(\hat{\gamma}) & 0 \\ \sin(\hat{\gamma}) & \cos(\hat{\gamma}) & 0 \\ 0 & 0 & 1 \end{bmatrix}$$

The parameter of mapping from the first on-board sensor to the vehicle body is determined based on the plurality of first feature points and the coordinates of the plurality of second feature points in the vehicle body coordinate system. In other words, the translation vector T and the rotation matrix R are determined based on the plurality of first feature points and the coordinates of the plurality of second feature points in the vehicle body coordinate system.

It should be noted that determining the parameter of mapping from the first on-board sensor to the vehicle body based on the plurality of first feature points and the coordinates of the plurality of second feature points in the vehicle body coordinate system is calibrating an extrinsic parameter of the first on-board sensor.

Optionally, the determining a parameter of mapping from the first on-board sensor to the vehicle body based on the plurality of first feature points and the coordinates of the plurality of second feature points in the vehicle body coordinate system includes: determining that a precision check on the plurality of first feature points succeeds; and determining the parameter of mapping from the first on-board sensor to the vehicle body based on the plurality of first feature points that succeed in the precision check and the coordinates of the plurality of second feature points in the vehicle body coordinate system.

Optionally, when the first on-board sensor is the laser radar on-board sensor or the millimeter-wave radar on-board sensor, the determining that a precision check on the plurality of first feature points succeeds includes: determining an initial parameter $f_{LIDAR}^0$ of mapping from the first on-board sensor to the vehicle body based on the plurality of first feature points and the coordinates of the plurality of second feature points in the vehicle body coordinate system; determining coordinates of the first feature points in the vehicle body coordinate system based on coordinates of the first feature points and the initial mapping parameter; determining coordinates of the first feature points in the map database based on the coordinates of the first feature points in the vehicle body coordinate system and the POS sensor; and when a difference between the determined coordinates of each of the first feature points in the map database and coordinates of a second feature point that matches the first feature point in the map database is less than a first threshold, determining that the precision check on the first feature points succeeds.

Optionally, the first threshold is three times of an average empirical error $\sigma_0$. When the difference between the determined coordinates of each of the first feature points in the map database and the coordinates of each of the second feature points that match the first feature points in the map database is less than the first threshold, it is determined that the precision check on the first feature points succeeds. When the difference between the coordinates of each of the first feature points in the map database and the coordinates of each of the second feature points that match the first feature points in the map database is greater than the first threshold, the first feature points are mismatching points or gross-error points, and are removed.

It should be understood that the average empirical error $\sigma_0$ is based on sensor precision and a large quantity of sample tests. The first threshold is three times of the average empirical error $\sigma_0$, and is an empirical value. In different scenarios, the first threshold may be re-determined. This is not limited in this embodiment of this application.

Figure 3:
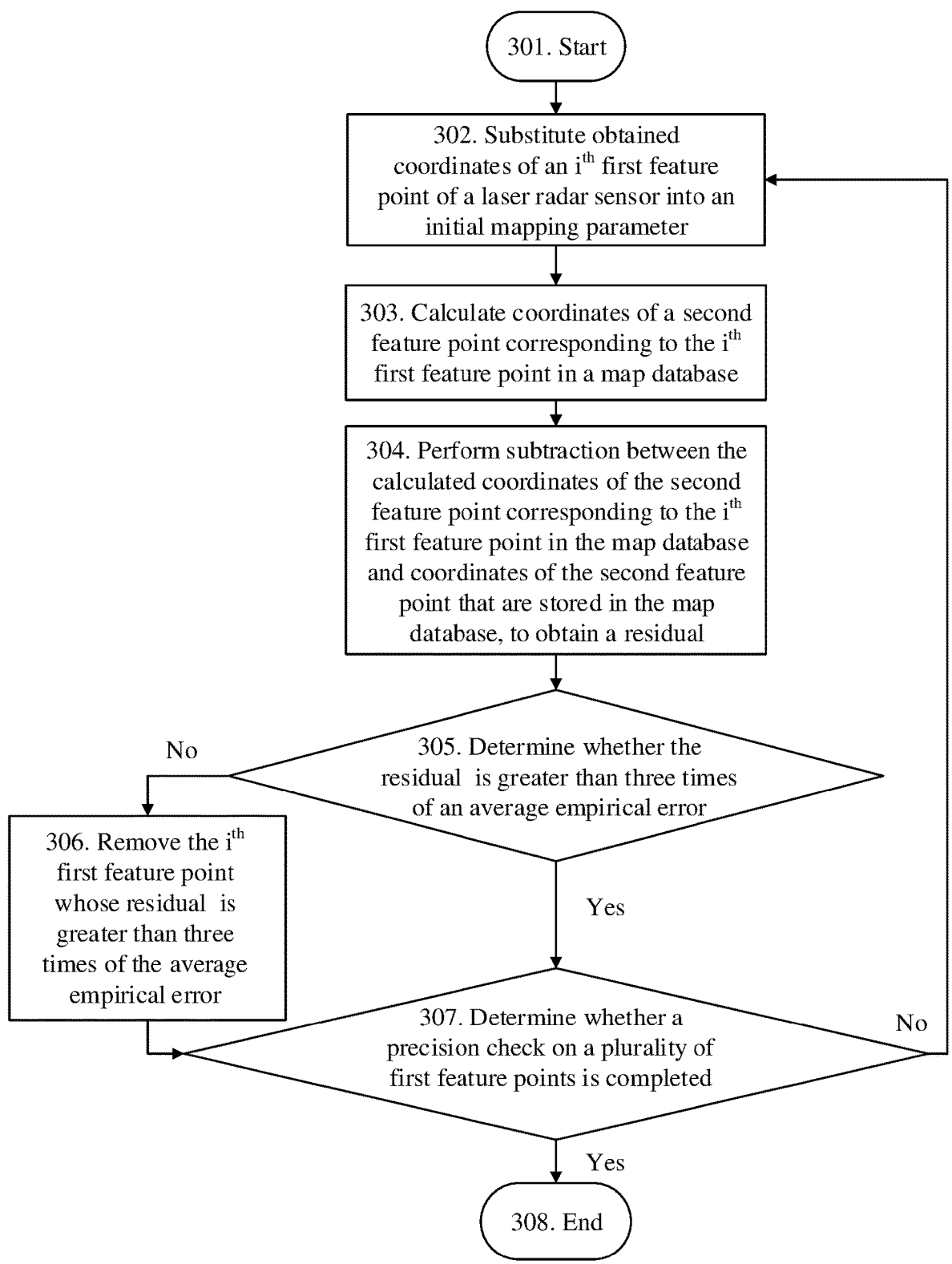
FIG. 3 is a schematic flowchart of determining, when a first on-board sensor is a laser radar on-board sensor or a millimeter-wave radar on-board sensor, that a precision check on a plurality of first feature points succeeds according to an embodiment of this application.

Specifically, FIG. 3 is a schematic flowchart of determining, when the first on-board sensor is the laser radar on-board sensor or the millimeter-wave radar on-board sensor, that the precision check on the plurality of first feature points succeeds.

301. A procedure of the precision check on the first feature points starts.

302. Substitute obtained coordinates of an $i^{th}$ first feature point of the laser radar sensor into the initial mapping parameter $f_{LIDAR}^0$.

303. Calculate coordinates of a second feature point corresponding to the $i^{th}$ first feature point in the map database.

304. Perform subtraction between the calculated coordinates of the second feature point corresponding to the $i^{th}$ first feature point in the map database and coordinates of the second feature point that are stored in the map database, to obtain a residual $\sigma_i$.

305. Determine whether the residual $\sigma_i$ is greater than three times of $\sigma_0$.

306. Remove the $i^{th}$ first feature point whose residual $\sigma_i$ is greater than three times of $\sigma_0$.

307. Determine whether the precision check on the plurality of first feature points is completed.

308. If the precision check on the plurality of first feature points is completed, end the precision check procedure; or if the precision check on the plurality of first feature points is not completed, continue the precision check procedure.

Optionally, when the first on-board sensor is the camera on-board sensor, the determining that a precision check on the plurality of first feature points succeeds includes: determining an initial parameter of mapping from the first on-board sensor to the vehicle body based on the plurality of first feature points and the coordinates of the plurality of second feature points in the vehicle body coordinate system; determining pixel coordinates of the plurality of first feature points corresponding to the plurality of second feature points based on the coordinates of the plurality of matched second feature points in the vehicle body coordinate system and the initial mapping parameter; and when a difference between the determined pixel coordinates of each of the plurality of first feature points and obtained pixel coordinates of the first feature point is less than a second threshold, determining that the precision check on the first feature points succeeds.

Optionally, the second threshold is three times of the average empirical error $\sigma_0$. When the difference between the determined coordinates of each of the first feature points in the map database and the coordinates of each of the second feature points that match the first feature points in the map database is less than the second threshold, it is determined that the precision check on the first feature points succeeds. When the difference between the coordinates of each of the first feature points in the map database and the coordinates of each of the second feature points that match the first feature points in the map database is greater than the second threshold, the first feature points are mismatching points or gross-error points, and are removed.

It should be understood that the average empirical error $\sigma_0$ is based on sensor precision and a large quantity of sample tests. The second threshold is three times of the average empirical error $\sigma_0$, and is an empirical value. In different scenarios, the second threshold may be re-determined. This is not limited in this embodiment of this application.

Figure 4:
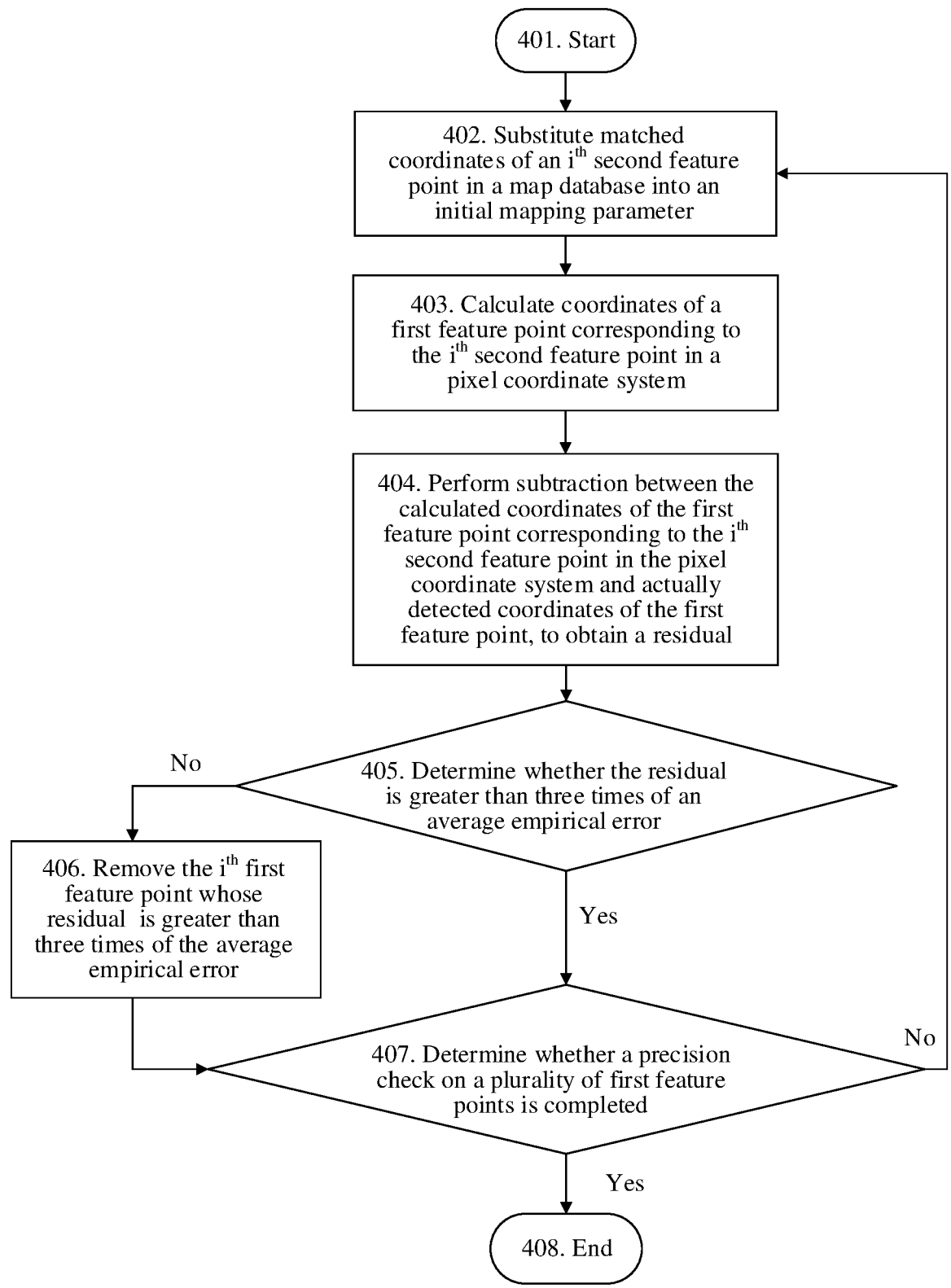
FIG. 4 is a schematic flowchart of determining, when a first on-board sensor is a camera on-board sensor, that a precision check on a plurality of first feature points succeeds according to an embodiment of this application.

Specifically, FIG. 4 is a schematic flowchart of determining, when the first on-board sensor is the camera on-board sensor, that the precision check on the plurality of first feature points succeeds.

401. A procedure of the precision check on the first feature points starts.

402. Substitute matched coordinates of an $i^{th}$ second feature point in the map database into $f_{cam}{}^0$.

403. Calculate coordinates of a first feature point corresponding to the $i^{th}$ second feature point in a pixel coordinate system.

404. Perform subtraction between the calculated coordinates of the first feature point corresponding to the $i^{th}$ second feature point in the pixel coordinate system and actually detected coordinates of the first feature point, to obtain a residual $\sigma_i$.

405. Determine whether the residual $\sigma_i$ is greater than three times of $\sigma_0$.

406. Remove the second $i^{th}$ feature point whose residual $\sigma_i$ is greater than three times of $\sigma_0$.

407. Determine whether the precision check on the plurality of first feature points is completed.

408. If the precision check on the plurality of first feature points is completed, end the precision check procedure; or if the precision check on the plurality of first feature points is not completed, continue the precision check procedure.

In this case, the precision check is performed on the first feature points, so that an error that may occur in a process of obtaining or matching the first feature points is avoided, an observed value with a gross error is automatically removed, and the parameter of mapping from the on-board sensor to the vehicle body is calibrated based on the first feature points that succeed in the precision check. This improves reliability and accuracy of the parameter of mapping from the on-board sensor to the vehicle body.

Optionally, a parameter of mapping from the vehicle body to the first on-board sensor is determined based on the determined parameter of mapping from the first on-board sensor to the vehicle body.

A parameter of mapping from a second on-board sensor to the first on-board sensor is determined based on a parameter of mapping from the second on-board sensor to the vehicle body and the parameter of mapping from the vehicle body to the first on-board sensor, where the parameter of mapping from the second on-board sensor to the vehicle body is determined based on the map database.

Optionally, inversion is performed on the parameter of mapping from the first on-board sensor to the vehicle body, to obtain the parameter of mapping from the vehicle body to the first on-board sensor.

Specifically, $f_{LIDAR}$ represents the parameter of mapping from the laser radar sensor to the vehicle body. An inversion operation is performed on $f_{LIDAR}$ to obtain $f_{LIDAR}{}^{-1}$, and $f_{LIDAR}{}^{-1}$ represents the parameter of mapping from the vehicle body to the laser radar sensor.

Optionally, the parameter of mapping from the second on-board sensor to the vehicle body is multiplied by the parameter of mapping from the vehicle body to the first on-board sensor, to obtain the parameter of mapping from the second on-board sensor to the first on-board sensor.

Specifically, $f_{cam}$ represents the parameter of mapping from the camera sensor to the vehicle body. An inversion operation is performed on $f_{cam}$ to obtain $f_{can}{}^{-1}$, and $f_{cam}{}^{-1}$ represents the parameter of mapping from the vehicle body to the camera sensor. Therefore, the parameter of mapping between the laser radar sensor and the camera sensor is $f_{LIDAR} \cdot f_{cam}{}^{-1}$.

In this case, the parameter $f_{LIDAR}$ of mapping from the laser radar sensor to the vehicle body, the parameter $f_{cam}$ of mapping from the camera sensor to the vehicle body, and the parameter $f_{radar}$ of mapping from the millimeter-wave radar sensor to the vehicle body are obtained, so that a mapping relationship between coordinates of any on-board sensor and any other on-board sensor can be implemented. This implements mutual calibration between on-board sensors.

Therefore, in this application, the device determines the second feature point information within the collection range of the first sensor in the map database, and the plurality of first feature points and the plurality of second feature points based on the first feature point information collected by the first on-board sensor and the geographic location of the vehicle body in the world coordinate system, and determines the parameter of mapping from the first on-board sensor to the vehicle body based on the plurality of first feature points and the coordinates of the plurality of second feature points in the vehicle body coordinate system. In this way, an on-board sensor of an autonomous vehicle can be automatically calibrated without relying on a fixed check place or laboratory, so as to improve user experience.

It should be understood that the method for calibrating an extrinsic parameter of an on-board sensor in this embodiment of this application may be applied to another sensor carrier platform such as an unmanned steamship or an unmanned aerial vehicle.

It should be further understood that the method for calibrating an extrinsic parameter of an on-board sensor in this embodiment of this application may be further applied to a sensor of another type. This is not limited in this embodiment of this application.

Figure 5:
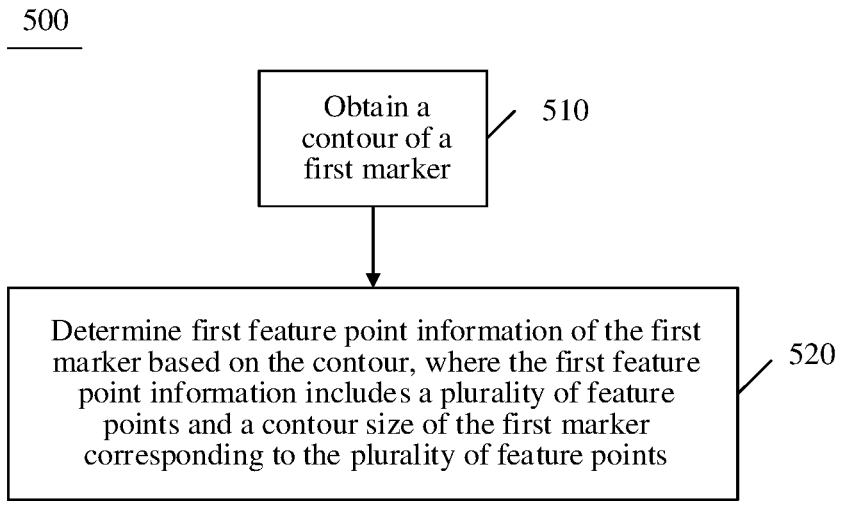
FIG. 5 is a schematic flowchart of a method 500 for collecting data by a laser radar sensor according to an embodiment of this application.

FIG. 5 is a schematic flowchart of a method 500 for collecting data by a laser radar sensor according to an embodiment of this application. As shown in FIG. 5, the method 500 includes the following content:

510. The laser radar sensor obtains a contour of a first marker.

520. Determine first feature point information of the first marker based on the contour, where the first feature point information includes a plurality of feature points and a contour size of the first marker corresponding to the plurality of feature points, and the plurality of feature points are a plurality of corner points of the first marker.

Optionally, the obtaining a contour of a first marker includes: extracting the contour of the first marker by using a point cloud filtering de-noising and region proximal point algorithm and a vector solving algorithm.

Specifically, the laser radar sensor needs to observe a building or a ground feature of another regular plane feature. First, by using the point cloud filtering de-noising and region proximal point algorithm and the vector solving algorithm, unrelated point cloud noise is removed and a building contour including a basic plane or surface is extracted, and then coordinates of the corners are obtained based on the size of the contour.

For example, on a city road, a building may be selected as a source for point cloud feature point extraction.

First, based on an existing point cloud de-noising and segmentation algorithm, two adjacent wall planes are obtained, and method vectors $\overline{n_1}$ and $\overline{n_2}$ of the two planes, and a length (L), a width (W), a height (H), and a plane included angle (A) of the building are obtained.

Then, the extracted feature points are obtained by using an intersection point of two contact lines in a length direction and a width direction. If the length of the building is along a road direction, each building may have two optional feature points, which are sequentially defined as a feature point 1 and a feature point 2.

Figure 6:
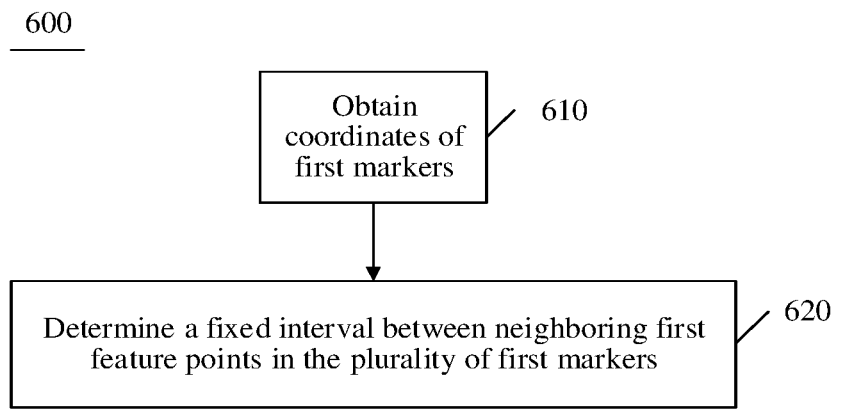
FIG. 6 is a schematic flowchart of a method 600 for collecting data by a millimeter-wave radar sensor according to an embodiment of this application.

FIG. 6 is a schematic flowchart of a method 600 for collecting data by a millimeter-wave radar sensor according to an embodiment of this application. As shown in FIG. 6, the method 600 includes the following content:

610. Obtain coordinates of a plurality of first markers, where an interval between the plurality of first markers is fixed in a linear direction.

620. Determine a fixed interval $d_1$ between neighboring first feature points in the plurality of first markers.

Specifically, an extrinsic parameter of the millimeter-wave radar sensor may be calibrated on a rod section having only a street lamp or on another road section having another ground feature with a fixed interval. In this case, there is no or less interference from other obstacles. In addition, a gap between to-be-extracted objects is fixed and known. Before travelling into a specified road section, the millimeter-wave radar collects two-dimensional coordinates of a series of obstacles (including a to-be-extracted feature point and another interfering obstacle). Because a gap between feature points is fixed, coordinates of obstacles (at least three points) with an average fixed gap $d_1$ on a straight line are obtained through screening from the coordinates collected by the millimeter wave.

Figure 7:
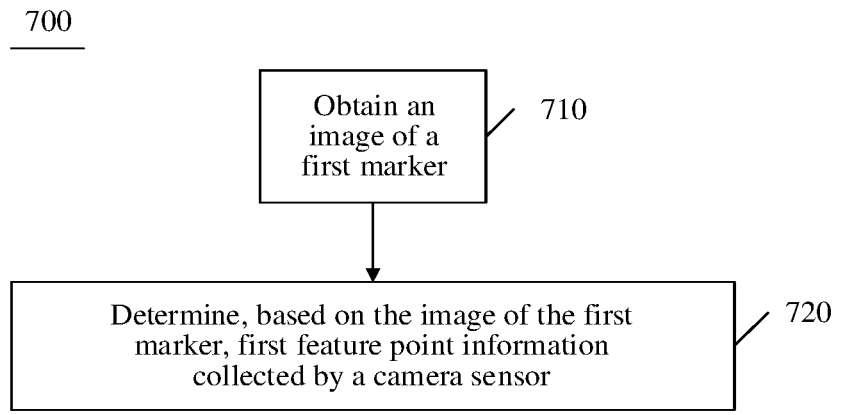
FIG. 7 is a schematic flowchart of a method 700 for collecting data by a camera sensor according to an embodiment of this application.

FIG. 7 is a schematic flowchart of a method 700 for collecting data by a camera sensor according to an embodiment of this application. As shown in FIG. 7, the method 700 includes the following content:

710. Obtain an image of a first marker.

720. Determine, based on the image of the first marker, first feature point information collected by the camera sensor, where the first feature point information includes pixel coordinates of the plurality of first feature points and an image size of the third marker, and the plurality of feature points constitute a geometric center of an image of the third marker.

Optionally, when the first marker is a traffic signal light, the determining, based on the image of the first marker, first feature point information collected by the camera sensor includes: respectively extracting all red, yellow, and green feature areas from the image through red, green, and blue channels; and extracting an edge point of the red-green-blue channel image; and determining a geometric center point of the red-green-blue channel image based on the edge point of the red-green-blue channel image; and obtaining pixel coordinates of the geometric center point of the red-green-blue channel image.

Figure 8:
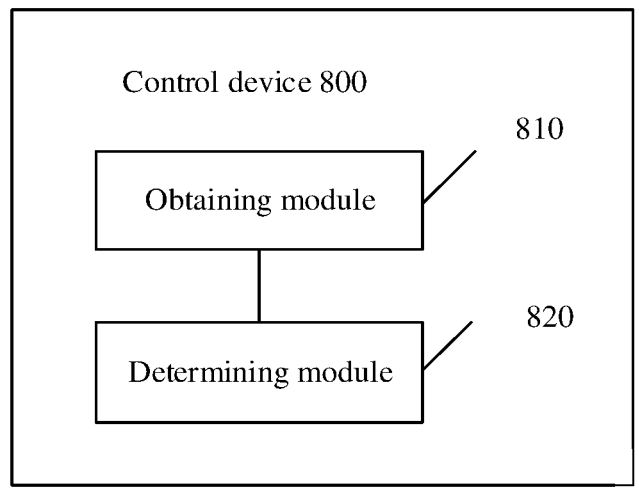
FIG. 8 is a schematic block diagram of a device 800 for calibrating an extrinsic parameter of an on-board sensor according to an embodiment of this application.

FIG. 8 is a schematic block diagram of a device 800 for calibrating an extrinsic parameter of an on-board sensor according to an embodiment of this application. As shown in FIG. 8, the device 800 includes: an obtaining module 810 configured to obtain first feature point information collected by a first on-board sensor; and a determining module 820 configured to determine a geographic location of the first on-board sensor in a world coordinate system.

The determining module 820 is further configured to determine second feature point information within a collection range of the first sensor in a map database based on the geographic location of the first on-board sensor in the world coordinate system, where the map database is established based on the world coordinate system.

The determining module 820 is further configured to determine a plurality of first feature points and a plurality of second feature points based on the first feature point information and the second feature point information.

The determining module 820 is further configured to determine a parameter of mapping from the first on-board sensor to the world coordinate system based on the plurality of first feature points and the plurality of second feature points.

Optionally, the obtaining module 810 and the determining module 820 are configured to perform the operations of the method 200 for calibrating an extrinsic parameter of an on-board sensor in the embodiments of this application. For brevity, details are not described herein again.

Figure 9:
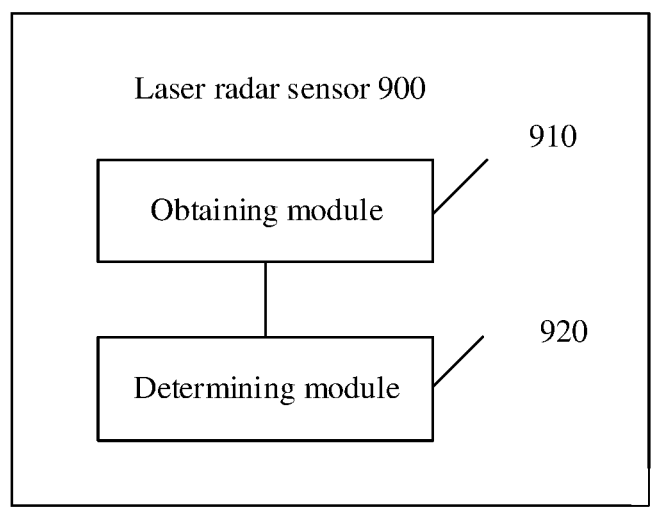
FIG. 9 is a schematic block diagram of a laser radar sensor 900 according to an embodiment of this application.

FIG. 9 is a schematic block diagram of a laser radar sensor 900 according to an embodiment of this application. As shown in FIG. 9, the laser radar sensor 900 includes: an obtaining module 910 configured to obtain a contour of a first marker; and a determining module 920 configured to determine first feature point information of the first marker based on the contour, where the first feature point information includes a plurality of feature points and a contour size of the first marker corresponding to the plurality of feature points, and the plurality of feature points are a plurality of corner points of the first marker.

Optionally, the obtaining module 910 and the determining module 920 are configured to perform the operations of the method 500 for calibrating an extrinsic parameter of an on-board sensor in the embodiments of this application. For brevity, details are not described herein again.

Figure 10:
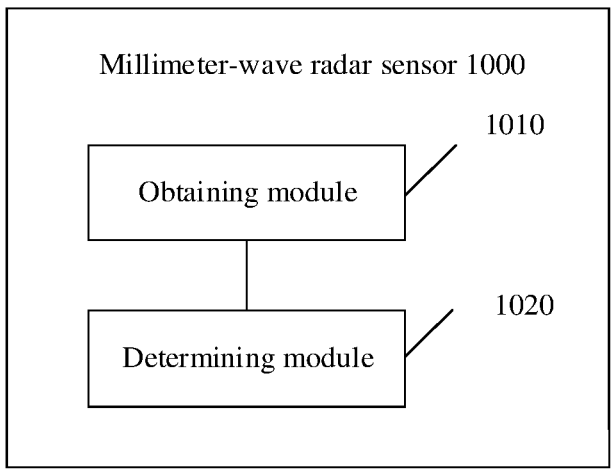
FIG. 10 is a schematic block diagram of a millimeter-wave radar sensor 1000 according to an embodiment of this application.

FIG. 10 is a schematic block diagram of a millimeter-wave radar sensor 1000 according to an embodiment of this application. As shown in FIG. 10, the millimeter-wave radar sensor 1000 includes: an obtaining module 1010 configured to obtain coordinates of a plurality of first markers, where an interval between the plurality of first markers is fixed in a linear direction; and a determining module 1020 configured to determine a fixed interval $d_1$ between neighboring first feature points in the plurality of first markers.

Figure 11:
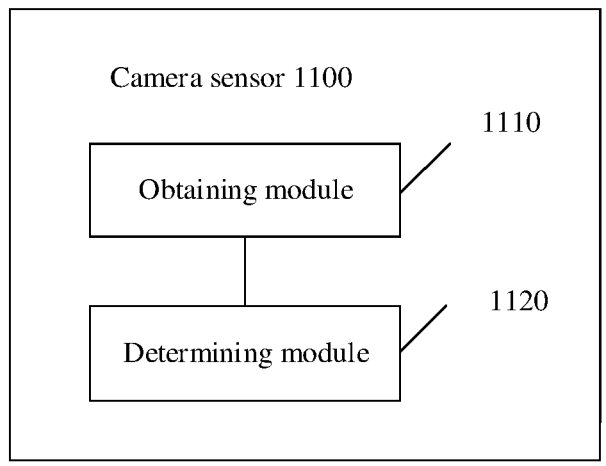
FIG. 11 is a schematic block diagram of a camera sensor 1100 according to an embodiment of this application.

FIG. 11 is a schematic block diagram of a camera sensor 1100 according to an embodiment of this application. As shown in FIG. 11, the camera 1100 includes: an obtaining module 1110 configured to obtain an image of a first marker; and a determining module 1120 configured to determine, based on the image of the first marker, first feature point information collected by the camera sensor, where the first feature point information includes pixel coordinates of the plurality of first feature points and an image size of the third marker, where the plurality of feature points constitute a geometric center of an image of the third marker.

Optionally, the obtaining module 1110 and the determining module 1120 are configured to perform the operations of the method 700 for calibrating an extrinsic parameter of an on-board sensor in the embodiments of this application. For brevity, details are not described herein again.

Figure 12:
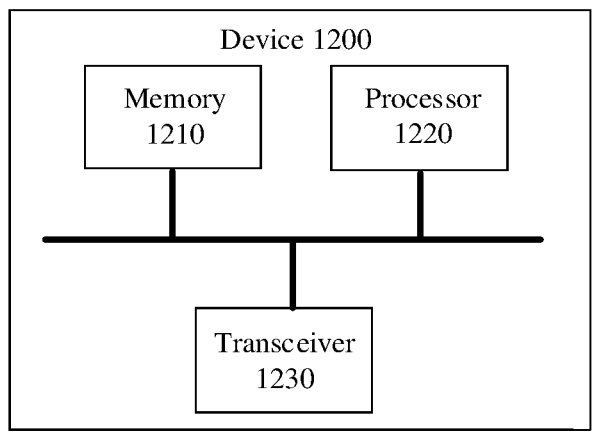
FIG. 12 is a schematic block diagram of an electronic device 1200 according to an embodiment of this application.

FIG. 12 is a schematic block diagram of a device 1200 according to an embodiment of this application. The device 1200 includes: a memory 1210 configured to store a program, where the program includes code; a processor 1220 configured to execute the program code in the memory 1210; and a transceiver 1230 configured to communicate with another device.

It should be understood that the device 1200 may be the computing apparatus 107 in the functional block diagram of the example vehicle 100 shown in FIG. 1.

Optionally, when the code is executed, the processor 1220 may implement the operations in the method 200, the method 500, the method 600, or the method 700. For brevity, details are not described herein again.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of a technical solution. A person skilled in the art may use different methods to implement the described functions for each particular application, but it should not be considered that the implementation goes beyond the scope of this application.

It may be clearly understood by the person skilled in the art that, for convenience and brevity of description, for specific working processes of the system, apparatus, and unit described in the foregoing, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this disclosure essentially, may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various media that can store program code, such as a USB flash drive, a removable hard disk, a read-only memory (ROM), a random-access memory (RAM), a magnetic disk, and an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a control device and comprising:
   obtaining first feature point information from a first on-board sensor located in a vehicle body;
   obtaining location information from a position and orientation system sensor located in the vehicle body;
   determining a first geographic location of the vehicle body in a world coordinate system based on the location information;
   determining second feature point information within a collection range of the first on-board sensor in a map database based on the first geographic location, wherein the map database is based on the world coordinate system;
   determining first feature points and second feature points based on the first feature point information and the second feature point information, wherein the first feature points are matched with the second feature points in the map database;
   determining first coordinates of the second feature points in a vehicle body coordinate system based on the first geographic location and second geographic locations of the second feature points in the world coordinate system; and
   determining, based on the first feature points and the first coordinates, a first parameter mapping the first on-board sensor to the vehicle body; and
   calibrating an extrinsic parameter based on the first parameter.

2. The method of claim 1, further comprising:
   determining a second parameter mapping the vehicle body to the first on-board sensor based on the first parameter;
   obtaining a third parameter mapping a second on-board sensor to the vehicle body; and
   determining a fourth parameter mapping the second on-board sensor to the first on-board sensor based on the second parameter and the third parameter.

3. The method of claim 2, further comprising:
   further determining the second parameter by performing inversion on the first parameter; and
   further determining the fourth parameter by multiplying the third parameter by the second parameter.

4. The method of claim 1, wherein before determining the first parameter, the method further comprises determining that a precision check on the first feature points succeeded.

5. The method of claim 4, wherein the first on-board sensor comprises a laser radar on-board sensor or a millimeter-wave radar on-board sensor, and wherein the method further comprises:
   determining an initial parameter mapping the first on-board sensor to the vehicle body based on the first feature points and the first coordinates;
   determining second coordinates of the first feature points in the vehicle body coordinate system based on the initial mapping parameter;
   determining third coordinates of the first feature points in the map database based on the second coordinates and the position and orientation system sensor; and
   determining that the precision check succeeded when a difference between the third coordinates and fourth coordinates of second feature points that match the first feature points in the map database is less than a first threshold.

6. The method of claim 5, wherein the first on-board sensor is the laser radar on-board sensor, wherein the method further comprises obtaining the first feature points and a contour size of a first marker corresponding to the first feature points, wherein the first feature points are corner coordinates of the first marker, and wherein determining the first feature points and the second feature points comprises when a difference between the contour size of the first marker corresponding to any one of the first feature points in the first feature point information and a contour size of a first marker corresponding to any one of the second feature points in the second feature point information is less than a third threshold, determining that the any one of the first feature points in the first feature point information is the first feature point and that the any one of the second feature points in the second feature point information is the second feature point.

7. The method of claim 5, wherein the first on-board sensor comprises the millimeter-wave radar on-board sensor, and wherein the method further comprises:
   obtaining the first feature points and a fixed interval d1 between neighboring first feature points in the first feature points; and
   when a difference between the fixed interval d1 between the neighboring feature points in the first feature points in the first feature point information and a fixed interval d between the neighboring feature points in the first feature points in the map database is less than a fourth threshold, determining that d1 is the first feature points and d is the second feature points.

8. The method of claim 4, wherein the first on-board sensor comprises a camera on-board sensor, and wherein the method further comprises:
   obtaining an image size of an image, wherein the image is of a third marker;
   obtaining pixel coordinates of first feature points of the third marker, wherein the first feature points constitute a geometric center of the image;
   determining a distance between the first on-board sensor and the third marker based on a geographic location of the first on-board sensor and fourth coordinates of the third marker in the map database;
   determining, based on the distance, a theoretical size of the third marker; and
   determining that the pixel coordinates are the first feature points and fourth coordinates are the second feature points when a difference between the theoretical size and an actual size of the third marker is less than a fifth threshold.

9. The method of claim 4, wherein the first on-board sensor comprises a camera on-board sensor, and wherein the method further comprises:
   determining an initial parameter mapping the first on-board sensor to the vehicle body based on the first feature points and the first coordinates;
   determining pixel coordinates of the first feature points corresponding to the second feature points based on fourth coordinates of second feature points in the vehicle body coordinate system and the initial mapping parameter; and
   determining that the precision check succeeded when a difference between the pixel coordinates is less than a second threshold.

10. A control device comprising:
    a memory configured to store instructions; and
    a processor coupled to the memory and configured to execute the instructions to:
      obtain first feature point information from a first on-board sensor located in a vehicle body;
      obtain location information from a position and orientation system sensor located in the vehicle body;
      determine a first geographic location of the vehicle body in a world coordinate system based on the location information;
      determine second feature point information within a collection range of the first on-board sensor in a map database based on the first geographic location, wherein the map database is based on the world coordinate system;
      determine first feature points and second feature points based on the first feature point information and the second feature point information, wherein the first feature points are matched with the second feature points in the map database;
      determine first coordinates of the second feature points in a vehicle body coordinate system based on the first geographic location and second geographic locations of the second feature points in the world coordinate system;
      determine, based on the first feature points and the first coordinates, a first parameter mapping the first on-board sensor to the vehicle body; and
    calibrate an extrinsic parameter based on the first parameter.

11. The control device of claim 10, wherein the processor is further configured to:
    determine a second parameter mapping the vehicle body to the first on-board sensor based on the first parameter;
    obtain a third parameter mapping a second on-board sensor to the vehicle body; and
    determine a fourth parameter mapping the second on-board sensor to the first on-board sensor based on the second parameter and the third parameter.

12. The control device of claim 11, wherein the processor is further configured to:
    further determine the second parameter by performing inversion on the first parameter; and
    further determine the fourth parameter by multiplying the third parameter by the second parameter.

13. The control device of claim 10, wherein before determining the first parameter, the processor is further configured to determine that a precision check on the first feature points succeeded.

14. The control device of claim 13, wherein the first on-board sensor comprises a laser radar on-board sensor or a millimeter-wave radar on-board sensor, and wherein the processor is further configured to:
    determine an initial parameter mapping the first on-board sensor to the vehicle body based on the first feature points and the first coordinates;
    determine second coordinates of the first feature points in the vehicle body coordinate system based on the initial mapping parameter;
    determine third coordinates of the first feature points in the map database based on the second coordinates and the position and orientation system sensor; and
    determine that the precision check succeeded when a difference between the third coordinates and fourth coordinates of second feature points that match the first feature points in the map database is less than a first threshold.

15. The control device of claim 14, wherein the first on-board sensor comprises the laser radar on-board sensor, and wherein the processor is further configured to:
    obtain the first feature points and a contour size of a first marker corresponding to the first feature points, wherein the first feature points are corner coordinates of the first marker; and
    when a difference between the contour size of the first marker corresponding to any one of the first feature points in the first feature point information and a contour size of the first marker corresponding to any one of the second feature points in the second feature point information is less than a third threshold, determine that the any one of the first feature points in the first feature point information is the first feature point and that the any one of the second feature points in the second feature point information is the second feature point.

16. The control device of claim 14, wherein the first on-board sensor comprises the millimeter-wave radar on-board sensor, and wherein the processor is further configured to:
   obtain coordinates of a plurality of second markers, wherein an interval between the plurality of second markers is fixed in a linear direction;
   determine, in the obtained coordinates of the plurality of second markers, the first feature point information collected by the first on-board sensor, wherein the first feature point information comprises a plurality of feature points and a fixed interval d1 between neighboring feature points in the plurality of feature points; and
   when a difference between the fixed interval d1 between the neighboring feature points in the first feature points in the first feature point information and a fixed interval d between the neighboring feature points in the first feature points in the map database is less than a fourth threshold, determine that d1 is the first feature points and d is the second feature points.

17. The control device of claim 13, wherein the first on-board sensor comprises a camera on-board sensor, and wherein the processor is further configured to:
   obtain an image size of an image, wherein the image is of a third marker;
   obtain pixel coordinates of first feature points of the third marker, wherein the first feature points constitute a geometric center of the image;
   determine a distance between the first on-board sensor and the third marker based on a geographic location of the first on-board sensor and fourth coordinates of the third marker in the map database;
   determine, based on the distance, a theoretical size of the third marker; and
   determine that the pixel coordinates are the first feature points and fourth coordinates are the second feature points when a difference between the theoretical size and an actual size of the third marker is less than a fifth threshold.

18. The control device of claim 13, wherein when the first on-board sensor comprises a camera on-board sensor, and wherein the processor is further configured to:
   determine an initial parameter mapping the first on-board sensor to the vehicle body based on the first feature points and the first coordinates;
   determine pixel coordinates of the first feature points corresponding to the second feature points based on fourth coordinates of second feature points in the vehicle body coordinate system and the initial mapping parameter; and
   determine that the precision check succeeded when a difference between the pixel coordinates is less than a second threshold.

19. A computer program product comprising computer-executable instructions for storage on a non-transitory computer-readable medium that, when executed by a processor, cause a control device to:
   obtain first feature point information from a first on-board sensor located in a vehicle body;
   obtain location information from a position and orientation system sensor located in the vehicle body;
   determine a first geographic location of the vehicle body in a world coordinate system based on the location information;
   determine second feature point information within a collection range of the first on-board sensor in a map database based on the first geographic location, wherein the map database is based on the world coordinate system;
   determine first feature points and second feature points based on the first feature point information and the second feature point information, wherein the first feature points are matched with the second feature points in the map database;
   determine first coordinates of the second feature points in a vehicle body coordinate system based on the first geographic location and second geographic locations of the second feature points in the world coordinate system,
   determine, based on the first feature points and the first coordinates, a first parameter mapping the first on-board sensor to the vehicle body; and
   calibrate an extrinsic parameter based on the first parameter.

20. The computer program product of claim 19, wherein the instructions further cause the control device to:
   determine a second parameter mapping the vehicle body to the first on-board sensor based on the first parameter;
   obtain a third parameter mapping a second on-board sensor to the vehicle body; and
   determine a fourth parameter mapping the second on-board sensor to the first on-board sensor based on the second parameter and the third parameter.

* * * * *